United States Patent [19]

Switzer

[11] Patent Number: 4,495,046

[45] Date of Patent: Jan. 22, 1985

[54] ELECTRODE CONTAINING THALLIUM (III) OXIDE

[75] Inventor: Jay A. Switzer, Placentia, Calif.

[73] Assignee: Union Oil Company of California, Los Angeles, Calif.

[21] Appl. No.: 524,394

[22] Filed: Aug. 18, 1983

Related U.S. Application Data

[63] Continuation-in-part of Ser. No. 496,284, May 19, 1983.

[51] Int. Cl.$^3$ .......................... C25F 1/00; C25B 11/00
[52] U.S. Cl. ................................. 204/242; 204/56 R; 204/128; 204/129; 204/290 R; 204/290 F; 427/126.3
[58] Field of Search ............... 204/290 R, 290 F, 291, 204/292, 129, 242, 128, 56 R; 427/126.3

[56] References Cited

U.S. PATENT DOCUMENTS

| | | | |
|---|---|---|---|
| 3,632,498 | 1/1972 | Beer | 204/290 F |
| 3,711,385 | 1/1973 | Beer | 204/59 |
| 4,028,215 | 6/1977 | Lewis et al. | 204/290 F |
| 4,040,939 | 8/1977 | Schenker et al. | 204/290 F |
| 4,065,377 | 12/1977 | Zollner | 204/290 F |
| 4,341,612 | 7/1982 | Oda | 204/290 F |
| 4,354,915 | 10/1982 | Stachurski | 204/292 |

OTHER PUBLICATIONS

Sharma, L. R. and Dutt, Jatinder, *Indian Journal of Chemistry*, vol. 8, pp. 170–173, (1970).
Ohzeki, K., Schunacher, E. and Umland, F., *Fresenius Z. Anal. Chem.*, 293, pp. 18–22, (1978).
Kraft, G., *Z. Anal. Chem.*, Bd. 238, pp. 321–414, (1967).

*Primary Examiner*—John F. Niebling
*Attorney, Agent, or Firm*—Dean Sandford; Gregory F. Wirzbicki; Alan H. Thompson

[57] ABSTRACT

An electrode useful in an electrolytic cell contains thallium (III) oxide. A method for enhancing the electrocatalytic activity and/or stability of an electrode includes compounding an outermost layer containing thallium (III) oxide with a conductive substrate. The electrode is particularly useful in reversible-type reactions such as the conversion of ferrocyanide to ferricyanide as well as in irreversible-type reactions, such as electrolysis of water to obtain hydrogen and oxygen or the electrolysis of chloride-containing solutions to obtain hydrogen and chlorine.

67 Claims, No Drawings

ELECTRODE CONTAINING THALLIUM (III) OXIDE

RELATED APPLICATION

This application is a continuation-in-part of co-pending application Ser. No. 496,284, filed on May 19, 1983.

BACKGROUND OF THE INVENTION

This invention relates to electrodes for electrolytic processes, the electrocatalysis of redox reactions and, more particularly, to outer film coverings on an electrode.

Electrochemical methods of manufacture are becoming ever increasingly important to the chemical industry due to their great ecological acceptability, potential for energy conservation and the resultant cost reductions possible. A great deal of effort has been applied to the hardware of such methods.

One major element of the hardware aspect is the electrode itself. In general, requirements of an effective electrode have included cost, stability, conductivity and electrocatalytic activity. An electrode cost within the range of commercial feasibility is desirable. Ordinarily, the electrode must be relatively stable toward its own oxidation or reduction by reactants, products and/or intermediates in an electrolytic cell. The conductivity of both the substrate and surface layers of the electrode is important from the viewpoint of minimizing voltage losses associated with ohmic drop across the surface and the formation of surface insulating layers. The electrocatalytic activity of the electrode for a selected reaction contributes toward lowering the potential and raising product selectivity in an electrolytic cell.

Only a few materials may effectively constitute an electrode, particularly as an anode, because of the susceptibility of most substances to intense corrosive conditions. Among the effective electrode materials are graphite, nickel, lead, lead alloy, platinum or platinized titanium. Electrodes of this type have limited application because of such disadvantages as a lack of dimensional stability, high cost, low chemical activity, contamination of the electrolyte, contamination of the cathode deposit, sensitivity to impurities, lack of selectivity for the desired reaction, and ineffective generation of current densities or high overpotentials when employed in cells. Ineffective current densities of electrodes employed in a large number of commercial electrolytic cells are ordinarily less than about 50 milliamps/square centimeter ($mA/cm^2$), while overpotentials typically refer to the excess electrical potential over the theoretical potential at which the desired product is discharged at the electrode surface.

Also, there are processes in which the products of electrolysis should preferably not be contaminated with material emitted from electrodes during operative conditions. When such a material is present in the products of the electrolysis, it must be removed by a separate treatment.

Many attempts and proposals have been disclosed to overcome some of the problems associated with electrodes and electrolytic cells, none of which seem to have accomplished an optimization of the desirable characteristics for an electrode. Presently, there is considerable interest in the development of films that can be deposited upon electrodes in an effort to lower the overpotential of selected redox reactions. Numerous film coatings have been employed on the surfaces of such electrodes, such as manganese dioxide, lead dioxide and the oxides of the platinum group metals.

However, a need still exists for electrolytic cells employing inexpensive, yet stable electrodes containing a surface coating that has effective electrocatalytic properties for selected reactions in such cells.

Accordingly, it is an objective of the invention to provide an electrode which utilizes relatively inexpensive materials and which is nevertheless stable during electrolytic processes and, additionally, is electrocatalytic to a number of reactions, such as oxidation or reduction of organic molecules.

Another object of the invention is to provide processes for making an electrode from substrates having low electrocatalytic activity and processes utilizing the electrode, especially in electrolytic cells.

It is a further objective of the invention to provide an electrode comprising a highly conductive electrocatalytic coating material and capable of generating a significant current when immersed in an electrolytic solution.

A further object still is to provide a coating material for a stable electrode that substantially enhances the electrocatalytic activity of the electrode as compared to the same electrode in the uncoated form.

A still further object is to provide an electrolytic cell employing an electrode containing an electrocatalytic coating material and, more particularly, to provide a cell employing an electrode capable of generating significant current densities.

These and other objects and advantages of the invention will become apparent from the following description.

SUMMARY OF THE INVENTION

Briefly, the invention involves an electrode containing thallium (III) oxide, a method of preparation of such an electrode, its use in an electrolytic cell and a method for enhancing the electrocatalytic properties of a material having low electrocatalytic activity in the uncoated form.

In one embodiment, the invention provides an electrode containing thallium (III) oxide, said electrode having the capability of generating a current of at least about 10 milliamperes when immersed in a 4 molar aqueous solution of sodium chloride and electrically connected to a platinum counter electrode.

In a preferred embodiment, the thallium (III) oxide is electrolytically deposited on a conductive substrate containing a material having low electrocatalytic activity in the uncoated form, such as titanium metal, and subsequently employed as an anode in an electrolytic cell involving the generation of either hydrogen and chlorine from aqueous chloride solutions or hydrogen and oxygen from water.

The electrolytic cells of the invention may be operated at relatively strong oxidizing potentials and typically contain solutions having a pH greater than about 5.

DETAILED DESCRIPTION OF THE INVENTION

The invention is directed to an electrolytic cell and an electrode therefor containing thallium (III) oxide. The electrode is well suited for use as an anode in an electrolytic cell, particularly for irreversible-type reactions, such as oxygen and hydrogen production from water and chlorine from chloride-containing materials or for reversible-type reactions, such as the oxidation of ferrocyanide to ferricyanide.

The electrode of the invention usually contains a substrate and, although the substrate may comprise any material, it typically contains a conductive material, preferably a metal or alloy. Such materials preferably contain at least one material having low electrocatalytic activity, including metals such as aluminum, tantalum, titanium, zirconium, bismuth, tungsten, niobium, molybdenum, or alloys of two or more of these metals. Also contemplated are metals such as iron, nickel, cobalt, lead, magnesium, manganese, chromium, vanadium, lanthanide metals or actinide metals, or alloys thereof, including stainless steel and non-metallic conductive materials such as glassy carbon or graphite. Substrate materials such as the noble metals, particularly platinum or gold, are useful in electrodes of the invention capable of generating a current greater than about 10 milliamperes when employed in electrolytic cells. Other useful substrates include semiconductors such as silicon, germanium and indium phosphide. Also useful are insulator-type materials such as glasses, ceramics and plastics. However, it is preferred that the resistivity of the conductive substrate, as a measure of its conductivity, be less than about $10^{-3\,1\,2}$ ohm-cm. It is highly preferred that the size of the substrate be effective for its intended purpose. For example, in commercial electrolytic cells, the substrate may have a surface area greater than 5 $cm^2$ and, more preferably, greater than 50 $cm^2$.

As used herein, materials having low electrocatalytic activity refer to those materials which, when employed as an anode immersed in a 4.0 molar aqueous solution of sodium chloride in an electrolytic cell having a platinum counter electrode, are capable of generating a maximum current density less than about 30 mA/$cm^2$ when the potential (V vs. SCE*) of the cell is set at the potential required for a comparative anode comprising the material having low electrocatalytic activity and thallium (III) oxide to generate a current density of 30 mA/$cm^2$ in a comparative electrolytic cell.
*Standard Calomel Electrode The electrode of the invention must contain a conductive coating material of thallium (III) oxide, preferably comprising at least a portion of the outermost layer on the electrode and more preferably, providing dimensional stability to the electrode. The thallium (III) oxide has a high resistance to detrimental interaction with electrolytic cell components, such as the electrolyte, redox couple or intermediate and/or final cell products, when exposed to the interior environment of an electrolytic cell generally having a pH greater than about 5, preferably at least about 6.5, and most preferably greater than 7.

Although a relatively thick layer of the thallium (III) oxide coating material may be sufficient for some uses of the electrode, the substrate may also be coated with a relatively thin layer. The electrode is preferably coated with a thin layer of thallium (III) oxide, containing at least an electrocatalytic amount. An electrocatalytic amount of thallium (III) oxide on the substrate is usually greater than about 0.01 grams of thallium (III) oxide per square meter (0.01 g/$m^2$) of the surface of the electrode. In one embodiment, "islands" of the thallium (III) oxide may be formed in sufficient amounts on a partially-exposed surface of the substrate to provide the electrode with adequate stability or electrocatalytic activity for the desired reaction. In another embodiment, the thallium (III) oxide may completely cover the surface of the substrate to a thickness that protects the substrate from detrimental interaction with electrolytic cell components (i.e. interior cell environment) or provides optimal surface area for electrocatalytic activity for a desired reaction. In still another embodiment, the thickness of the thallium (III) oxide may be greater than that of the substrate, especially when factors such as the resultant cost of manufacture or performance of the electrode for a selected reaction prevail.

An unusual feature of the thallium (III) oxide coating material used in the invention is its high conductivity. The resistivity of the thallium (III) oxide coating material, as a measure of its conductivity, is generally less than about $10^{-2}$ ohm-cm, preferably less than about $10^{-3}$ ohm-cm and most preferably less than about $10^{-4}$ ohm-cm.

Another feature of the thallium (III) oxide coating material is that, preferably, it is essentially naturally degenerate. Degeneracy, as used herein, is the condition of a material wherein its Fermi energy level is at least, and preferably greater than, that of the minimum energy of its conduction band for an n-type material or, in the case of p-type materials, the Fermi level is at most, and preferably less than, that of the maximum energy of its valence band.

Relatively thin layers of semiconductor or insulator-type materials may form on the surface of an uncoated substrate utilized in the invention. Ordinarily, the semiconductor or insulator-type material comprises a component of the substrate material, often in the form of an oxide of the substrate. In the electrode of the invention, the thallium (III) oxide coating material contacts and at least, in part, covers such layers of the semiconductor or insulator-type material. Such layers, in some cases, may contribute to dimensional stability of the electrode of the invention, for example, as by providing a better surface for adherence of the thallium (III) oxide to the bulk of the substrate. The semiconductor or insulator-type material contained in the electrode may be intentionally formed on the substrate. Layers of the semiconductor or insulator-type materials may also be "naturally grown," as by allowing components of air, such as oxygen, to interact with the surface of the substrate to form an oxide, or the layers may be formed by other techniques such as heating the substrate or conventional deposition. Usually, the semiconductor or insulator-type materials have an average thickness greater than about 10 angstroms, as measured by ellipsometry and conventional surface spectroscopy techniques as, for example, the Auger depth profiling technique.

An additional feature of the thallium (III) oxide coating material is its electrocatalytic property for promoting chemical reactions, especially oxidation or reduction reactions associated with a selected redox couple employed in an electrolytic cell. When contacted with a redox couple in a liquid, substrates utilized in the invention, without a coating material as required in the invention, may provide a relatively small or essentially no significant electrocatalytic effect upon such oxidation or reduction reactions. When the thallium (III) oxide coating material is present on the substrate, the electrocatalytic properties of the electrode of the invention are improved, especially when employed to generate a current density greater than about 60 mA/$cm^2$. The electrocatalytic property of the thallium oxide coating material is evidenced by an increase in the current density generated from the electrode utilized therewith in the electrolytic cell containing the selected redox couple, and generally by at least 1.1, preferably by at least 1.25, more preferably at least 1.5 and most preferably by at least 10 times that of a comparative (at the same potential) but uncoated electrode. In the alternative, while set to generate a given current density, preferably one above about 60 mA/cm$^2$, the electrode containing thallium (III) oxide allows a cell to operate at a lower voltage as compared to the comparative cell employing a comparative electrode without thallium (III) oxide. Due to such electrocatalytic properties, an electrode of the invention may also be termed an "electrocatalytic electrode." When the electrode of the invention is employed in an electrolytic cell wherein the desired oxidation-reduction reactions of the cell have been known to be promoted with electrocatalytic materials other than thallium (III) oxide, such materials may be combined with the thallium (III) oxide coating material required in the invention to further increase the current density (at a given potential) of the electrode or further lower the voltage. Examples of such electrocatalytic promoter materials optionally contained on at least a portion of the outermost surface of the electrode of the invention include components of ruthenium, iridium, rhodium, platinum and palladium.

The electrocatalytic property of thallium (III) oxide is exhibited when compounded with a number of substrates and utilized in a number of reactions. For example, when coated on three different substrates, platinum, carbon and titanium, typically having different electrocatalytic properties for the reaction evolving oxygen gas from aqueous media at an anode of an electrolytic cell (typically hydrogen is simultaneously evolved at the cathode), the potentials required to effect a given current density are lower than those required when comparable uncoated substrates are employed. Similar electrocatalytic properties of thallium (III) oxide are exhibited for the redox reaction involving the oxidation of ferrocyanide to ferricyanide and, in general, oxidation or reduction reactions converting organic molecules to their respective oxidized or reduced forms.

It is preferred that the electrode of the invention be capable of generating a current of at least about 10 milliamperes, more preferably at least about 50 milliamperes and most preferably at least about 100 milliamperes when immersed in a 4.0 Molar aqueous solution of sodium chloride and electrically connected to a platinum counter electrode along with conventional electrolytic cell components. Such current generation capability of the electrode of the invention is in contrast to that of electrodes generating current less than one milliampere, such as indicator electrodes and the like.

To prepare the electrode, an outer surface of the substrate, preferably containing a minor portion of an insulator-type material, is compounded with the thallium (III) oxide coating material. The compounding may be accomplished by conventional techniques including vacuum evaporation, sputtering, chemical vapor deposition (CVD), spray pyrolysis and mechanical methods such as brushing, spraying and impregnation.

The thallium (III) oxide coating materials of the invention may preferably be compounded with the substrate by an electrolytic deposition technique. In the electrolytic deposition technique, the coating material is deposited on the surface of a substrate to be employed as an anode or cathode in an electrolytic cell that contains a redox couple comprising thallium (III) oxide coating material precursors. The electrolytical cell is preferably biased with electrical energy from an external source, and furthermore, the thickness of the thallium (III) oxide coating material on the substrate may conveniently be controlled by monitoring the current such as by measuring the coulombs per unit area passed through the cell. Control of the thickness of thallium (III) oxide relative to the coulombs passed through the cell is dependent upon such factors as cell stoichiometry, current density and density of the coating material. A galvanostatic anodization technique may be utilized wherein a constant current is employed in the cell while variation in the voltage occurs during deposition. Another technique is a potentiostatic anodization of the coating material onto the substrate. In such a technique, a constant voltage is employed in the cell during the time of cell operation.

Although biasing of the electrolytic cell during production of the electrode of the invention is usually done with an external source of electrical energy to the cell, an internal source of energy may serve to replace all or part of the electrical biasing. Such a variation is the electroless deposition process wherein electrical biasing is replaced by the energy generated from the oxidation and/or reduction of a selected redox couple. The electrodes prepared by electroless deposition techniques may contain substrates comprising semiconductor or insulator-type materials unstable in a solution usually having a pH greater than about 5 and more often greater than about 7.

Conventional techniques may also be employed for preparing electrical conducting means from the electrode to the external circuit. The conducting means may comprise an extension of the substrate material. Also, ohmic electrode contacts containing conductive materials such as metals, solders, epoxies, eutectics, alloys, and combinations thereof, may be formed with the substrate portion of the electrode. The ohmic electrode connecting the electrical conducting means from the electrode to the external circuit may be constructed as a single-point contact or multiple-point contacts. Electrical conducting means, such as a wire, may conveniently be constructed with the cell employing the electrode and components of other electrolytic cells or devices.

An advantage for preparing the electrode of the invention by an electrolytic deposition technique is that thallium (III) oxide precursors may by incorporated into an electrolytic cell, including new cells or previously existing ones. In one embodiment, components in an existing electrolytic cell such as an existing electrolyte and/or redox couple may be replaced with a thallium (III) oxide precursor such as thallium (I) components that may be conveniently oxidized onto the electrodes (or selectively oxidized onto a given anode or cathode) during cell operation. In another embodiment, thallium (III) oxide precursors may be added to an existing operating cell such that the existing electrodes may be effectively coated, in situ, so as to maintain and/or further extend the desired results from the cell.

In a highly preferred embodiment for preparing an electrode of the invention, a thallium (III) oxide-containing coating material is electrolytically deposited at the anode of a cell on a substrate containing a metal having low electrocatalytic activity such as titanium. During deposition, such a cell is preferably electrically biased, while a thallium (I) ion-containing solution is oxidized to thallium (III)-containing components on the substrate surface. The galvanostatic and potentiostatic anodization techniques are preferred.

The electrode of the invention is useful as an anode or cathode in an electrolytic cell involving a chemical reaction, and particularly in cells generating a current of at least 10 milliamperes. In general, an electrocatalytic conversion reaction producing oxidized or reduced organic or inorganic materials may be effected in such cells. Preferably, organic compounds, including those having an index of hydrogen deficiency greater than zero, can be oxidized in electroorganic synthesis cells employing the electrode of the invention. This index is described by J. B. Hendrickson, D. J. Cram and G. S. Hammond, Organic Chemistry, Third Edition, McGraw-Hill, Inc., 1970, at pages 72–73 and 82–83, as the number of pairs of hydrogen atoms which must be removed from a saturated alkane to give the empirical formula of a subject compound. For a hydrocarbon, then, the index represents the total of the rings and multiple bonds in a molecule. For compounds containing heteroatoms, the following principles can be used to make the index application: (1) oxygen and sulfur atoms do not change the index; (2) each halogen atom is equivalent to one-half of a hydrogen atom pair; and (3) each nitrogen atom requires that the "reference" saturated alkane be considered as having one extra hydrogen atom (i.e., a formula of $C_nH_{2n+3}$).

Moreover, the reactions promoted by the electrode of the invention may be the reversible-type such as conversion of the ferrocyanide/ferricyanide redox couple or irreversible-type reactions such as the production of oxygen and hydrogen gases from water (electrolysis) or the production of chlorine and hydrogen from chloride-containing aqueous solutions. More particularly, when the electrode of the invention is employed at the anode of such cells, products such as chlorine and oxygen are generated.

In the case of chlorine gas production on the electrode of the invention, the current generated at higher potentials, such as above about 1.74 volts vs. SCE, is surprisingly greater than the current generated on a platinum metal anode. For instance, at potentials ranging up to about 1.7 volts vs. SCE, a platinum metal anode employed in a chloride electrolysis cell generates a greater current density during chlorine evolution than an electrode of the invention in a comparative cell. However, at a potential above about 1.74 volts vs. SCE, the electrode of the invention at the anode generates a current density at least about 10 mA/cm$^2$ more than that of the comparative uncoated platinum electrode. Also, higher current values are maintained for a substantial period of time, i.e. an indication of the stability of the electrode of the invention.

The electrode of the invention may advantageously be utilized in electrolytic cells at relatively strong oxidizing potentials, more than about −0.25 vs. SCE, and typically greater than +0.5 volts vs. SCE, and preferably greater than +1.0 volt vs. SCE. Also, the solution containing the electrolyte and/or the selected redox couple in the cell usually has a pH greater than about 5, preferably greater than about 6.5 and more preferably greater than about 7. The electrode performs effectively at a current density more than about 1 mA/cm$^2$, preferably greater than about 30 mA/cm$^2$ and most preferably greater than about 60 mA/cm$^2$.

Other uses of the electrode of the invention include cathodic protection systems for marine equipment, electrolytic cleaning, electrolytic production of metal powders and electroplating processes.

The invention is further illustrated by the following examples which are illustrative of specific modes of practicing the invention and are not intended as limiting the scope of the invention defined by the appended claims.

EXAMPLE I

Electrodes T, P and C of the invention are prepared by electrolytic deposition as follows:

Electrode T

A titanium metal substrate is polished and placed in an alkaline (1.0 M NaOH) solution of 0.5 thallium (I) acetate and electrolyzed at a constant anodic current density using a PARC 173 D potentiostat/galvanostat (i.e. galvanostatic anodization) of 5 mA/cm$^2$ for 5 coulombs. A digital coulometer is used to control the layer of thallium (III) oxide coating material deposited on the titanium to an average thickness of approximately 63,000 angstroms.

Electrode P

The electrode is prepared in a similar manner to that of Electrode T, except a polished platinum substrate is utilized in place of titanium.

Electrode C

The electrode is prepared in a similar manner to that of Electrode T, except a glassy carbon substrate is utilized in place of titanium.

EXAMPLE II

Thirty-three electrolytic cells are constructed with Electrodes T, P and C of Example I, inclusive (in odd-numbered cells in Tables I, II and III below), and thirty-three electrolytic cells with comparative uncoated Electrodes $T_1$, $P_1$ and $C_1$ (in even-numbered cells in Tables I, II and III below), each comparative electrode not containing a thallium (III) oxide coating material.* Each cell employs the electrodes as anodes, while a platinum counter electrode is employed at the cathode.

*Comparative uncoated electrodes $T_1$, $P_1$ and $C_1$ are prepared by removing thallium (III) oxide coatings from respective electrodes T, P and C by soaking in 1.0 M ascorbic acid and 1.0 M perchloric acid (HClO$_4$), and then polishing.

In cells 1 through 24, inclusive, the electrodes are immersed in a solution of 4.0 M sodium chloride. During operation of these stirred-solution cells, an irreversible-type reaction occurs wherein chloride is oxidized to chlorine gas (Cl$_2$) at the anode and hydrogen gas evolved at the cathode (i.e. chloride oxidation cell). Observed current densities of the electrodes and applied potentials during operation of such cells are summarized in Table I.

In cells 25 through 48, inclusive, the electrodes are immersed in a water solution of 1.0 M sodium hydroxide. During operation of these stirred-solution cells, an irreversible-type reaction occurs wherein water molecules or hydroxide ions are oxidized to oxygen gas (O$_2$) at the anode and hydrogen gas evolved at the cathode (i.e. water electrolysis cell). Observed current densities and applied potentials during operation of such cells are summarized in Table II.

In cells 49 through 66, inclusive, the electrodes are immersed in an alkaline solution (1.0 M NaOH) of 0.35 M/0.35 M ferrocyanide/ferricyanide [Fe(CN)$_6^{-4}$/Fe(CN)$_6^{-3}$]. During operation of these stirred-solution cells, a reversible-type reaction occurs wherein ferrocyanide is oxidized to ferricyanide at the anode, and ferricyanide is reduced to ferrocyanide at the platinum counter electrode. Observed current densities and applied potentials during operation of such cells are summarized in Table III.

corded at such time that there is obtained a net change of less than five (5) percent of the observed current density or potential of the previous minute. Also, the surface area of the electrode of the invention and comparative uncoated electrodes are smaller than that of the platinum counter electrode.)

TABLE I
Oxidation of Chloride

| Cell No. | Electrode | Curr. Dens. w/P, T or C mA/cm$^2$ | Cell Voltage V | Electrode Potential (V vs. SCE) | Cell No. | Electrode | Curr. Dens. w/P$_1$, T$_1$ or C$_1$ mA/cm$^2$ | Curr. Dens. Ratio of (P/P$_1$), (T/T$_1$) or (C/C$_1$) |
|---|---|---|---|---|---|---|---|---|
| 1 | P | 30 | 1.82 | 1.70 | 2 | P$_1$ | 36.2 | 0.829 |
| 3 | P | 60 | 1.90 | 1.74 | 4 | P$_1$ | 48.7 | 1.23 |
| 5 | P | 90 | 1.97 | 1.77 | 6 | P$_1$ | 59.2 | 1.52 |
| 7 | P | 120 | 2.02 | 1.79 | 8 | P$_1$ | 70.4 | 1.71 |
| 9 | T | 30 | 3.35 | 1.89 | 10 | T$_1$ | 0.376 | 79.8 |
| 11 | T | 60 | 3.43 | 1.92 | 12 | T$_1$ | 0.381 | 157.0 |
| 13 | T | 90 | 3.48 | 1.95 | 14 | T$_1$ | 0.376 | 239.0 |
| 15 | T | 120 | 3.50 | 1.97 | 16 | T$_1$ | 0.375 | 320.0 |
| 17 | C | 30 | 1.74 | 1.65 | 18 | C$_1$ | 5.53 | 5.43 |
| 19 | C | 60 | 1.90 | 1.76 | 20 | C$_1$ | 9.44 | 6.36 |
| 21 | C | 90 | 2.01 | 1.83 | 22 | C$_1$ | 9.86 | 9.13 |
| 23 | C | 120 | 2.15 | 1.90 | 24 | C$_1$ | 10.1 | 1.9 |

TABLE II
Electrolysis of Water

| Cell No. | Electrode | Curr. Dens. w/P, T or C mA/cm$^2$ | Cell Voltage V | Electrode Potential (V vs. SCE) | Cell No. | Electrode | Curr. Dens. w/P$_1$, T$_1$ or C$_1$ mA/cm$^2$ | Curr. Dens. Ratio of (P/P$_1$), (T/T$_1$) or (C/C$_1$) |
|---|---|---|---|---|---|---|---|---|
| 25 | P | 30 | 1.20 | 1.01 | 26 | P$_1$ | 10.8 | 2.78 |
| 27 | P | 60 | 1.29 | 1.07 | 28 | P$_1$ | 20.8 | 2.89 |
| 29 | P | 90 | 1.37 | 1.13 | 30 | P$_1$ | 42.9 | 2.10 |
| 31 | P | 120 | 1.43 | 1.19 | 32 | P$_1$ | 65.1 | 1.79 |
| 33 | T | 30 | 1.40 | 0.856 | 34 | T$_1$ | 0.137 | 219.0 |
| 35 | T | 60 | 2.31 | 1.06 | 36 | T$_1$ | 0.125 | 480.0 |
| 37 | T | 90 | 2.79 | 1.48 | 38 | T$_1$ | 0.432 | 208.0 |
| 39 | T | 120 | 3.00 | 1.61 | 40 | T$_1$ | 0.591 | 203.0 |
| 41 | C | 30 | 1.27 | 0.960 | 42 | C$_1$ | 0.514 | 58.4 |
| 43 | C | 60 | 1.59 | 1.27 | 44 | C$_1$ | 2.81 | 21.4 |
| 45 | C | 90 | 1.68 | 1.34 | 46 | C$_1$ | 4.35 | 20.7 |
| 47 | C | 120 | 1.77 | 1.40 | 48 | C$_1$ | 6.32 | 19.0 |

TABLE III
Oxidation of Ferrocyanide

| Cell No. | Electrode | Curr. Dens. w/P, T or C mA/cm$^2$ | Cell Voltage V | Electrode Potential (V vs. SCE) | Cell No. | Electrode | Curr. Dens. w/P$_1$, T$_1$ or C$_1$ mA/cm$^2$ | Curr. Dens. Ratio of (P/P$_1$), (T/T$_1$) or (C/C$_1$) |
|---|---|---|---|---|---|---|---|---|
| 49 | P | 30 | 0.018 | 0.272 | 50 | P$_1$ | 17.1 | 1.75 |
| 51 | P | 60 | 0.037 | 0.290 | 52 | P$_1$ | 43.0 | 1.40 |
| 53 | P | 90 | 0.057 | 0.310 | 54 | P$_1$ | 67.9 | 1.33 |
| 55 | T | 30 | 0.078 | 0.313 | 56 | T$_1$ | 0.150 | 200.0 |
| 57 | T | 60 | 0.176 | 0.395 | 58 | T$_1$ | 0.148 | 405.0 |
| 59 | T | 90 | 0.330 | 0.545 | 60 | T$_1$ | 0.357 | 252.0 |
| 61 | C | 30 | 0.034 | 0.279 | 62 | C$_1$ | 16.4 | 1.83 |
| 63 | C | 60 | 0.071 | 0.304 | 64 | C$_1$ | 36.9 | 1.63 |
| 65 | C | 90 | 0.115 | 0.335 | 66 | C$_1$ | 59.0 | 1.53 |

The observed electrode potentials (V vs. SCE) and cell voltages during operation of the above-mentioned cells employing Electrodes T, P and C, containing thallium (III) oxide coatings, and generating a constant current density of 30, 60, 90 or 120 mA/cm$^2$ are summarized in the odd-numbered cells in Tables I, II and III. Also, these observed electrode potentials from the cells employing Electrodes P, T and C are then applied in the comparative cells employing Electrodes P$_1$, T$_1$ and C$_1$, containing no thallium (III) oxide coatings and the observed current densities are summarized in the even-numbered cells in Tables I, II and III. (Note: Stabilized current densities and potentials are observed and re- The ratios of the current density of an electrode containing thallium (III) oxide (odd-numbered cells of Tables I, II and III) to the current density of the electrodes lacking thallium (III) oxide in comparative cells (even-numbered cells in Tables I, II and III) indicate that electrocatalytic properties of electrodes comprising substrate materials coated with thallium (III) oxide may be enhanced by a factor of about 1.23 times to about 480 times that of equivalent electrodes comprising substrate materials lacking thallium (III) oxide. More particularly, an electrode containing a substrate having relatively low electrocatalytic activity, such as titanium, exhibits a substantial increase in electrocatalytic activity, at least about 79.8 times (cell 10 compared to 9, Table I) and, in most cases, from about 200 to about 480 times (cells 13 and 15 in Table I; cells 33, 35, 37 and 39 in Table II; cells 55, 57 and 59 in Table III) that of the uncoated titanium.

The ratio of current densities of the coated to uncoated electrodes is greater than 1.0 in all comparable cells wherein the potential applied to the cell is required to generate at least 60 mA/cm$^2$ when employing thallium (III) oxide coated electrodes. Cells 4, 6 and 8, employing thallium (III) oxide containing electrodes of the invention, all exhibit surprisingly better current densities than their comparative cells 3, 5 and 7, which employ an uncoated platinum anode which is known to be a desirable electrode for the redox couple involving the oxidation of chloride to chlorine.

While particular embodiments of the invention have been described, it will be understood, of course, that the invention is not limited thereto since many obvious modifications can be made, and it is intended to include within this invention any such modifications as will fall within the scope of the invention as defined by the appended claims.

I claim:

1. An electrode useful in an electrolytic cell comprising the compound thallium (III) oxide, said electrode capable of generating a current of at least 10 milliamperes when immersed in a 4.0 molar aqueous solution of sodium chloride and electrically connected to a platinum counter electrode.

2. The electrode as defined in claim 1 further comprising a substrate.

3. The electrode as defined in claim 2 wherein said substrate is selected from the group consisting of aluminum, tantalum, titanium, zirconium, bismuth, tungsten, niobium, molybdenum, iron, nickel, cobalt, lead, magnesium, manganese, chromium, vanadium, gold, platinum, graphite, an actinide metal and a lanthanide metal.

4. The electrode as defined in claim 1 wherein said thallium (III) oxide comprises the outermost coating of said electrode.

5. The electrode as defined in claim 1 wherein at least a portion of the outermost surface of said electrode comprises an electrocatalytic promoter material selected from the group consisting of components of ruthenium, iridium, rhodium, platinum and palladium.

6. An electrode useful in an electrolytic cell comprising the compound thallium (III) oxide and a substrate other than platinum.

7. The electrode as defined in claim 6 wherein said substrate is other than graphite.

8. The electrode as defined in claim 6 wherein said thallium (III) oxide comprises the outermost coating of said electrode.

9. The electrode as defined in claim 6 wherein said thallium (III) oxide comprises at least 0.01 grams/m$^2$ of the surface of said electrode.

10. The electrode as defined in claim 6 wherein said substrate is selected from the group consisting of aluminum, tantalum, titanium, zirconium, bismuth, tungsten, niobium, molybdenum, iron, nickel, cobalt, lead, magnesium, manganese, chromium, vanadium, gold, graphite, an actinide metal and a lanthanide metal.

11. An electrode useful in an electrolytic cell comprising the compound thallium (III) oxide and a conductive substrate containing a material having low electrocatalytic activity.

12. The electrode as defined in claim 11 being characterized by the capability of allowing an electrolytic cell to operate at a lower voltage as compared to a comparative cell employing a comparative electrode without thallium (III) oxide.

13. The electrode as defined in claim 11 wherein said conductive substrate is selected from the group consisting of aluminum, tantalum, molybdenum, titanium, zirconium, bismuth, tungsten, niobium and alloys thereof.

14. The electrode as defined in claim 11 wherein said conductive substrate is titanium.

15. The electrode as defined in claim 11 wherein said conductive substrate comprises iron, lead, nickel or cobalt.

16. The electrode as defined in claim 11 wherein said conductive substrate is non-metallic.

17. The electrode as defined in claim 11 wherein said conductive substrate is graphite.

18. The electrode as defined in claim 11 wherein said thallium (III) oxide comprises the outermost coating of said electrode.

19. The electrode as defined in claim 11 wherein said thallium (III) oxide comprises at least 0.01 grams/m$^2$ of the surface of said electrode.

20. The electrode as defined in claim 11 wherein said thallium (III) oxide is essentially naturally degenerate.

21. The electrode as defined in claim 11 wherein the resistivity of said thallium (III) oxide and said substrate are less than $10^{-2}$ ohm-cm.

22. The electrode as defined in claim 11 further comprising a layer of semiconductor or insulator-type material containing a component of said substrate, said layer located between said substrate and said thallium (III) oxide.

23. The electrode as defined in claim 11 being characterized by the capability of generating at least 1.25 times the current density of said electrode without thallium (III) oxide in comparative electrolytic cells wherein both electrodes are operated at comparative conditions.

24. An electrode useful in an electrolytic cell comprising the compound thallium (III) oxide on a substrate containing a metal selected from the group consisting of aluminum, tantalum, molybdenum, titanium, zirconium, bismuth, tungsten, niobium, iron, lead, nickel and cobalt.

25. The electrode as defined in claim 24 wherein said thallium (III) oxide comprises the outermost coating on said electrode.

26. The electrode as defined in claim 24 being characterized by the capability of generating a greater current density in an electrolytic cell than generated by said electrode without thallium (III) oxide at the same potential in volts vs. SCE.

27. The electrode as defined in claim 26 wherein said greater current density is at least 1.5 times that of said electrode without thallium (III) oxide.

28. The electrode as defined in claim 24 wherein said thallium (III) oxide is essentially naturally degenerate.

29. The electrode as defined in claim 24 wherein said thallium (III) oxide comprises at least 0.01 grams/m$^2$ of the surface of said electrode.

30. The electrode as defined in claim 24 further comprising a layer of semiconductor or insulator-type material containing a component of said substrate, said layer located between said substrate and said thallium (III) oxide.

31. A method for preparation of an electrode, said method comprising deposition of the compound thallium (III) oxide on the outermost surface of a substrate, said electrode being capable of generating a current of at least about 10 milliamperes when immersed in a 4.0 molar aqueous solution of sodium chloride and electrically connected to a platinum counter electrode.

32. The method as defined in claim 31 wherein said deposition is electrolytic deposition.

33. The method as defined in claim 31 wherein said deposition comprises electroless deposition.

34. The method as defined in claim 31 wherein said deposition comprises galvanostatic or potentiostatic anodization of said substrate.

35. The method as defined in claim 31 wherein thallium (III) oxide precursors are added to an electrolytic cell prior to said deposition.

36. A method for preparation of an electrocatalytic electrode, said method comprising deposition of the compound thallium (III) oxide on the outermost surface of an electrode having a conductive substrate containing a material having low electrocatalytic activity.

37. The method as defined in claim 36 wherein thallium (III) oxide precursors are added to an electrolytic cell prior to said deposition.

38. An electrolytic cell employing the electrode of claim 1.

39. The cell defined in claim 38 producing oxidized or reduced organic materials.

40. The cell defined in claim 38 further comprising a redox couple selected from the group consisting essentially of ferricyanide/ferrocyanide, water/$H_2$, water/$O_2$ and chloride/chlorine.

41. The cell defined in claim 38 employing the electrode of claim 1 at the anode and further comprising a ferricyanide/ferrocyanide redox couple.

42. The cell defined in claim 38 employing the electrode of claim 1 at the anode and wherein chlorine is produced at said anode.

43. The cell defined in claim 38 employing the electrode of claim 1 at the anode and wherein oxygen gas is produced at the anode.

44. The cell defined in claim 38 wherein said electrode generates a current density greater than about 1 mA/cm$^2$.

45. The cell defined in claim 38 further comprising a solution having a pH greater than about 5.0.

46. The cell defined in claim 38 further comprising organic compounds having an index of hydrogen deficiency greater than zero.

47. The cell defined in claim 38 operating at a potential greater than $-0.25$ volts vs. SCE.

48. The cell defined in claim 38 wherein said conductive substrate is selected from the group consisting of aluminum, tantalum, molybdenum, titanium, zirconium, bismuth, tungsten, niobium and alloys thereof.

49. The cell defined in claim 38 wherein said electrode generates oxygen from water at a potential greater than about 0.5 volt vs. SCE.

50. An electrolytic cell comprising an electrode containing the compound thallium (III) oxide on a conductive substrate having a resistivity less than $10^{-2}$ ohm-cm, said electrode being capable of generating a current greater than 10 milliamperes at a potential greater than $-0.25$ volt vs. SCE.

51. The cell as defined in claim 50 wherein said conductive substrate is selected from the group consisting of aluminum, tantalum, titanium, zirconium, bismuth, tungsten, niobium, molybdenum, iron, nickel, cobalt, lead, magnesium, manganese, chromium, vanadium, gold, platinum, graphite, an actinide metal and a lanthanide metal.

52. The cell as defined in claim 50 wherein said potential is greater than about $+0.5$ volt vs. SCE.

53. The cell as defined in claim 50 further comprising an organic compound having an index of hydrogen deficiency greater than zero.

54. An electrolytic cell employing the electrode of claim 6.

55. An electrolytic cell employing the electrode of claim 11.

56. An electrolytic cell employing the electrode of claim 24.

57. An electrolytic cell employing an electrode prepared by the method of claim 31.

58. An electrolytic cell employing an electrode prepared by the method of claim 36.

59. A method for preparing an electrocatalytic electrode which method comprises compounding a substrate with the compound thallium (III) oxide to form a thallium (III) oxide-containing composition having a substantially increased electrocatalytic activity than that of said substrate.

60. The method as defined in claim 59 wherein said thallium (III) oxide-containing composition has increased electrocatalytic activity greater than about 1.1 times that of said substrate.

61. The method as defined in claim 59 wherein said substrate comprises a conductive material.

62. The method as defined in claim 59 wherein said thallium (III) oxide comprises at least 0.01 gram/m$^2$ of the surface of said thallium (III) oxide-containing composition.

63. An electrolytic cell employing an electrode prepared by the method of claim 59.

64. An electrode useful in an electrolytic cell comprising an outermost coating consisting essentially of thallium (III) oxide on a substrate containing a material having low electrocatalytic activity.

65. The electrode defined in claim 64 wherein said substrate contains a metal selected from the group consisting of aluminum, tantalum, molybdenum, titanium, zirconium, bismuth, tungsten, niobium, iron, lead, nickel, cobalt, magnesium, manganese, chromium, vanadium, lanthanide metals, actinide metals, and alloys thereof, and stainless steel.

66. The electrode defined in claim 64 wherein said substrate is an insulator-type material.

67. The electrode defined in claim 66 wherein said substrate is selected from the group consisting of glass, ceramic and plastic.

* * * * *